United States Patent [19]
Cascio

[11] 3,885,435
[45] May 27, 1975

[54] METHOD AND DEVICE FOR DETECTING PRESENCE OR ABSENCE OF A FLUID

[75] Inventor: Salvatore J. Cascio, Hopewell Junction, N.Y.

[73] Assignee: International Business Machines Corporation, Armonk, N.Y.

[22] Filed: May 28, 1974

[21] Appl. No.: 473,462

[52] U.S. Cl................... 73/290 R; 73/37; 137/386
[51] Int. Cl. ............................................ G01f 23/22
[58] Field of Search.......... 73/290 R, 299, 302, 409, 73/388 BN, 37, 37.5; 116/65, 70, 118 R, 118 A, 109; 137/557, 558, 82, 393, 386; 235/201 FS

[56] References Cited
UNITED STATES PATENTS

| | | | |
|---|---|---|---|
| 1,631,909 | 6/1927 | Badin | 73/388 BN X |
| 2,853,041 | 9/1958 | Oakes | 116/109 |
| 3,590,843 | 7/1971 | Meyer | 73/299 X |
| 3,712,136 | 1/1973 | Monsen | 73/290 R |
| 3,734,313 | 5/1973 | Gauthier et al. | 73/290 R |

Primary Examiner—Charles A. Ruehl
Attorney, Agent, or Firm—Frank C. Leach, Jr.; William J. Dick

[57] ABSTRACT

The presence or absence of a fluid at a selected level in a tank is sensed or detected through having an expansible container, which contains fluid from the tank when the tank has fluid at the selected level, to block a pressurized gas flow path. The pressure of the pressurized gas along its flow path is determined and functions to indicate the presence or absence of fluid at the selected level in the tank.

14 Claims, 1 Drawing Figure

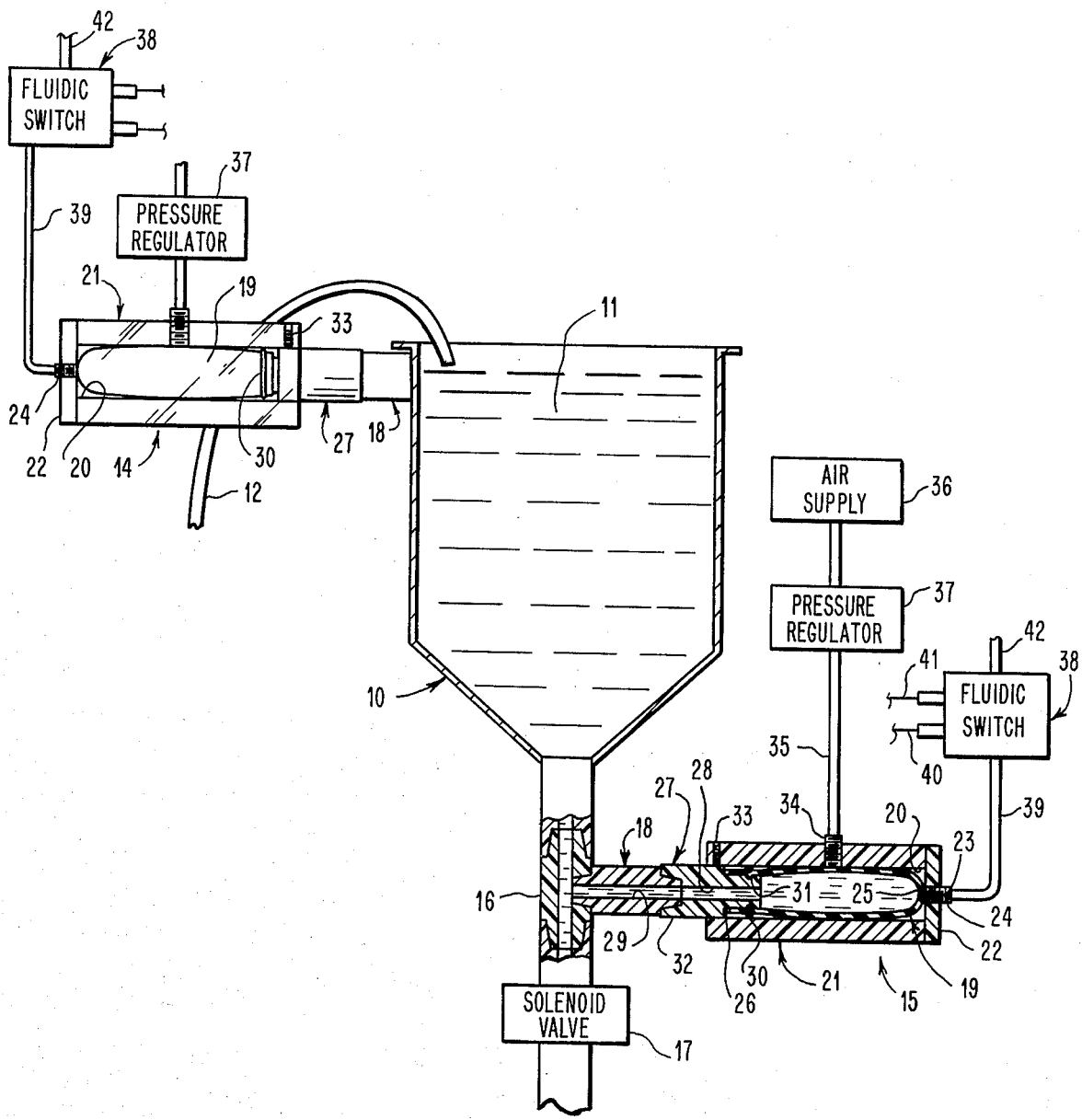

METHOD AND DEVICE FOR DETECTING PRESENCE OR ABSENCE OF A FLUID

In manufacturing semiconductor wafers, it is necessary to subject each wafer to various chemical liquids in various tanks. To be able to automatically treat the wafer at each of the processing tanks, it is necessary that a fixed quantity of the chemical liquid be disposed in the tank prior to treating the wafer and that all of the liquid be drained after treatment of the wafer and prior to refilling the tank with the fixed quantity of the chemical liquid. Furthermore, for automatic processing of the wafer, these various conditions of the chemical liquid in each tank must be sensed or detected so that a control system can regulate the various steps of filling a tank to a selected level so that it contains the fixed quantity of the chemical liquid, disposing the wafer in the filled tank for chemical treatment, removing the wafer from the tank, completely draining the tank, and refilling the tank to the selected level.

One system of detecting or sensing the presence or absence of a liquid at selected lower and upper levels in a tank has been to supply a first path of pressurized air at the selected lower level of the tank and a second path of pressurized air at the selected upper level of the tank. Each of these two paths of pressurized air flows through a device, which senses when the pressure drops because of the liquid at the particular level blocking the exit of the pressurized air path into the tank.

However, this results in bubbles being created in the tank because the previously suggested system continues to supply pressurized air when the liquid is at the selected level. This is not desired in a semiconductor wafer processing tank because the bubbles can cause presplashing of the wafer by the chemical liquid in the tank. As a result, the desired uniform treatment of the wafer would not be obtained.

Additionally, some chemical liquids contain wetting agents. Bubbles from pressurized air or other gases would form a foam with the wetting agent at the surface of the chemical liquid. This foam can go higher than the level of the chemical liquid and tends to form salts. These salts are particulate matter and can adhere to the wafer during treatment so that the processed wafer is not satisfactory and must be discarded.

Furthermore, it would be necessary to use an inert gas such as nitrogen, for example, rather than air as the pressurized gas in the previously suggested system when used with a semiconductor wafer processing tank. This is because oxidation of the chemical liquid would occur with the air and weaken the strength of the chemical liquid so that the desired treatment of the wafer would not occur. Nitrogen is relatively expensive and continued bleeding of the nitrogen into the tank would not be economically feasible.

Additionally, it would be necessary to use a prefiltered inert gas or filter the inert gas along its flow path prior to mixing with the chemical liquid to remove any particulate matter from the inert gas to prevent contamination of the chemical liquid by foreign matter in the inert gas. This contamination also would affect processing of a semiconductor wafer. This prefiltering of the inert gas or filtering along the flow path of the inert gas would further increase the cost of processing a semiconductor wafer. Furthermore, the filtering of the inert gas at a very low pressure is difficult to accomplish.

The present invention satisfactorily solves the foregoing problems by providing a device to sense the presence or absence of the chemical liquid in the processing tank at a selected level without any direct contact between the chemical liquid and the pressurized air. Thus, the present invention eliminates the creation of any air bubbles within the chemical liquid while still sensing or detecting the presence or absence of the chemical liquid at a selected level.

The present invention accomplishes this detecting or sensing without intermixing by having an expansible container filled with liquid when the liquid is at the selected level in the tank. This expands the expansible container to block the supply of pressurized air through the support means in which the expansible container is disposed. When the liquid is not at the selected level, the expansible container collapses because of the pressurized air and does not block the pressurized air flow through the support means. The pressure of the pressurized air in its flow path is determined to indicate whether the expansible container is blocking the flow path so as to indicate the presence of liquid at the selected level or is not blocking the flow path so that liquid is not at the selected level.

The expansible container of the present invention eliminates any need for using a prefiltered inert gas or filtering of the inert gas along its flow path as in the previously suggested system when used with a semiconductor wafer processing tank since there is no intermixing of the pressurized gas, which can contain particulates, with the chemical liquid. By eliminating any filtering requirement, the present invention overcomes the problem of using a prefiltered inert gas or filtering an inert gas at a very low pressure as would be required if the chemical liquid were exposed directly to the pressurized gas as in the previously suggested system.

The present invention uses one of the devices to sense when the tank is filled to the desired level and another of the devices to sense when the tank is empty after treatment of the semiconductor wafer. Accordingly, the devices can indicate to the control system when a wafer can be disposed in the tank for processing and when the tank can be refilled.

Additionally, the size of the tubing of the previously suggested system is such that it cannot be used for a relatively low volume of a chemical liquid such as 125 to 150 cc, for example. However, this small volume processing tank is utilized in treatment of a semiconductor wafer.

The present invention also solves this problem of the relatively small volume of the tank since there is no introduction of the pressurized air into the tank. Thus, only a very small port is necessary for communication with the tank at the selected level for the device of the present invention to function.

An object of this invention is to detect the presence or absence of a fluid at a selected level in a tank or the like.

Another object of this invention is to provide a method and device using a pressurized gas to sense the presence or absence of a fluid in a tank or the like at a selected level without any direct contact between the pressurized gas and the fluid.

The foregoing and other objects, features, and advantages of the invention will be apparent from the following more particular description of the preferred embodiment of the invention as illustrated in the accompanying drawing.

In the drawing, the single FIGURE is a schematic elevational view, partly in section, showing the devices of the present invention utilized to sense the presence or absence of a fluid in a tank at two different selected levels.

Referring to the drawing, there is shown a tank 10, which is filled with a chemical liquid 11 by means of a supply tube 12. The chemical liquid 11 is filled to a selected level so that a fixed volume of the liquid 11 is within the tank 10.

An upper detecting device 14 of the present invention is disposed to sense the presence or absence of the liquid 11 at the level at which the fixed volume of the liquid 11 is within the tank 10. When this occurs, supply of the chemical liquid 11 through the supply tube 12 is automatically stopped by the control system in response to a signal from the upper detecting device 14.

After a semiconductor wafer has been disposed within the chemical liquid 11 in the tank 10 for treatment and then removed, a lower detecting device 15 of the present invention indicates when the tank 10 has the chemical liquid 11 drained therefrom through an adapter 16 by opening of a solenoid valve 17. The control system opens the solenoid valve 17 after the wafer has been removed from the tank 10 and closes the solenoid valve 17 after the lower detecting device 15 provides a signal to indicate that the tank 10 is empty of the chemical liquid 11.

The adapter 16 has a nipple 18 of the lower detecting device 15 providing communication between the bottom of the tank 10 and an expansible container 19. The expansible container 19 is disposed within a longitudinal passage 20 of circular cross section in a support tube 21. The passage 20 of the support tube 21 is closed at one end by an end cover 22 to form a chamber.

The end cover 22 has an opening or outlet 23 in its center to which a hose connector 24 is connected. When the expansible container 19, which is formed of silicone rubber, for example, is in its expanded condition, its curved closed end 25 blocks the opening 23 as shown in the drawing.

The open end of the expansible container 19 fits over a reduced cylindrical portion 26 of a support stud 27. The support stud 27 has a longitudinal passage 28 extending therethrough and communicating with the interior of the expansible container 19 and a longitudinal passage 29 in the nipple 18. Thus, the expansible container 19 communicates with the bottom end of the tank 10.

The expansible container 19 is retained on the reduced portion 26 of the support stud 27 by an O-ring 30 fitting over the expansible container 19 and being disposed within a groove 31 in the reduced portion 26 of the support stud 27. The support stud 27 has a cylindrical portion 32, which is of larger diameter than the reduced portion 26, partially disposed within the passage 20 in the support tube 21. A set screw 33 retains the support stud 27 within the support tube 21.

The support tube 21 has a hose connector 34 intermediate its ends to which a hose 35 is connected. Air is supplied to the hose 35 from an air supply 36 through a pressure regulator 37. The pressure regulator 37 provides a pressurized air at approximately 0.65 p.s.i. as its output.

A fluidic switch 38 communicates with the hose connector 24 through a hose 39. The fluidic switch 38 may be any type capable of supplying a signal in accordance with the pressure supplied thereto.

One suitable example of the fluidic switch 38 is sold by Fairchild Semiconductor as model PSF 100A. This switch can be selected to be sensitive to either 0.1 or 0.5 inch of water head.

When the path of pressurized air from the pressure regulator 37 is not blocked in its passage through the support tube 21 by the expansible container 19 being in its expanded condition, the fluidic switch 38 produces a first output signal over electrical lines 40 and 41 to the control system since the pressurized air flows through the fluidic switch 38 and exits by an outlet hose 42. When the expansible container 19 blocks the flow of pressurized air through the support tube 21, the absence of pressure in the hose 39 is sensed by the fluidic switch 38 and produces a second output signal, which indicates this condition, over the electrical lines 40 and 41 to the control system.

The upper detecting device 14 contains all of the same elements as the lower detecting device 15 except that the adapter 16 is not required since the nipple 18 is connected directly to the tank 10 at the selected level to which it is desired the chemical liquid 11 to be filled to have the fixed volume in the tank 10. The elements of the upper detecting device 14 are identified by the same number. It should be understood that the pressure regulator 37 of the upper detecting device 14 is connected to the same air supply 36 as the pressure regulator 37 of the lower detecting device 15.

Considering the operation of the present invention with the tank 10 emptied and the solenoid valve 17 closed, the chemical liquid 11 is supplied through the supply tube 12 until the tank 10 is filled to the level at which the expansible container 19 of the upper detecting device 14 expands due to the presence of the chemical liquid 11 therein because of the liquid 11 reaching its selected level. When this occurs, the curved closed end 25 of the expansible container 19 of the upper detecting device 14 blocks the outlet 23 to the hose connector 24 to stop flow of the pressurized air from the pressure regulator 37 through the support tube 21. When this occurs, the absence of pressure in the hose 39 is sensed by the fluidic switch 38 and transmits a signal to the control system to stop supply of the liquid 11 through the supply tube 12. This signal also enables the control system to be able to dispose a semiconductor wafer within the tank 10 when desired for treatment.

When the tank 10 starts to fill, the expansible container 19 of the lower detecting device 15 expands to have its curved closed end 25 block the outlet 23 to the hose connector 24 to stop the flow of pressurized air through the support tube 21 from the pressure regulator 37. This results in an absence of pressure in the hose 39 so that the fluidic switch 38 of the lower detecting device 15 senses this and supplies a signal through the lines 40 and 41 to the control system to indicate that the tank 10 has the chemical liquid 11 therein. However, this is not the governing signal in filling but does indicate that filling has started.

After the semiconductor wafer has been disposed in the tank 10 and removed, then the solenoid valve 17 is opened by the control system. When the solenoid valve 17 opens, the chemical liquid 11 drains from the tank 10 and causes the chemical liquid 11 in the expansible container 19 of the lower detecting device 15 to drain therewith through the nipple 18 and the adapter 16. As a result, the expansible container 19 collapses and no longer blocks the passage of pressurized air from the pressure regulator 37 through the support tube 21 of the lower detecting device 15. As a result, the fluidic switch 38 of the lower detecting device 15 senses the presence of pressure in the hose 39 and transmits a signal indicating this to the control system by the electrical lines 40 and 41. When this occurs, the control system causes closing of the solenoid valve 17 so that the tank 10 can receive another fixed volume of the chemical liquid 11.

It should be understood that the opening of the solenoid valve 17 results in the upper detecting device 14 sensing the absence of the chemical liquid 11 at its location prior to the lower detecting device 15 sensing the absence of the chemical liquid 11 at its level. However, the signal from the upper detecting device 14 is not the controlling signal to the control system when emptying the tank 10.

While the present invention has shown and described the fluidic switch 38 as being connected to the hose connector 24 through the hose 39, it should be understood that the hose 39 of the fluidic switch 38 could be connected to the hose 35 between the hose connector 34 and the pressure regulator 37 if desired. In this arrangement, the increased back pressure in the hose 35 would be sensed by the fluidic switch 38. Thus, the fluidic switch 38 would be sensing an increased pressure when the expansible container 19 is blocking the flow path through the support tube 21 rather than an absence of pressure that occurs when the fluidic switch 38 is connected to the hose connector 24 through the hose 39.

While the present invention has shown and described pressurized air as being the gas passing through the support tube 21, it should be understood that any other pressurized gas could be employed. Furthermore, while the tank 10 has been described as having the chemical liquid 11 therein, it should be understood that any fluid could be utilized. Of course, it would be necessary to close the tank 10 with a gas as the fluid.

While the present invention has particular utility in the processing of semiconductor wafers, it should be understood that the fluid detecting device of the present invention may be utilized wherever it is desired to ascertain the presence or absence of a fluid at a selected level. Thus, it may be employed wherever it is desired to not have any mixing between the sensing medium, which is the pressurized gas, and the fluid, which is having its presence or absence at a selected level detected.

The support tube 21 and the end cover 22 are preferably formed of clear polyvinyl chloride. The adapter 16, the nipple 18, and the support stud 27 are preferably formed of Teflon.

An advantage of this invention is that the pressurized gas, which functions as the sensing medium, does not mix with the fluid which is having its presence or absence at a selected level sensed. Another advantage of this invention is that no bubbles are produced in the tank. A further advantage of this invention is that it insures that the filled or empty condition of the tank is known. Still another advantage of this invention is that it is highly accurate while being of relatively low cost.

While the invention has been particularly shown and described with reference to a preferred embodiment thereof, it will be understood by those skilled in the art that various changes in form and details may be made therein without departing from the spirit and scope of the invention.

What is claimed is:

1. A device for detecting the presence or absence of a fluid in a tank or the like at a selected level including:
   expansible means to contain fluid from the tank when the tank has fluid at the selected level to cause said expansible means to be in an expanded condition;
   means to support said expansible means;
   means to supply a pressurized gas through said support means;
   said expansible means stopping supply of pressurized gas from said supply means through said support means when said expansible means is in its expanded condition due to said expansible means containing fluid because of the tank containing fluid at the selected level, said expansible means collapsing to allow supply of pressurized gas from said supply means through said support means when the fluid flows from said expansible means due to the fluid not being present in the tank at the selected level;
   and means to determine whether pressurized gas from said supply means flows through said support means.

2. The device according to claim 1 in which:
   said support means comprises a housing;
   said housing having:
      an inlet connected to said supply means;
      and an outlet;
   and said expansible means blocks communication between said inlet and said outlet when said expansible means is in its expanded condition because of fluid therein due to the tank containing fluid at the selected level.

3. The device according to claim 2 in which:
   said housing has a chamber in which said expansible means is disposed;
   said inlet and said outlet communicating with said chamber;
   and said expansible means comprises an expansible container having the fluid therein.

4. The device according to claim 3 in which said container has a curved closed end to block said outlet when said expansible container is in its expanded condition.

5. The device according to claim 4 in which said determining means includes means to sense the pressure of the pressurized gas along its flow path.

6. The device according to claim 4 in which said determining means includes means to sense the pressure of the pressurized gas beyond said outlet of said housing.

7. The device according to claim 2 in which said supply means includes means to supply the pressurized gas at a selected pressure to said inlet of said housing.

8. The device according to claim 7 in which said determining means includes means to sense the pressure of the pressurized gas beyond said outlet of said housing.

9. The device according to claim 7 in which said determining means includes means to sense the pressure of the pressurized gas along its flow path.

10. The device according to claim 1 in which said determining means includes means to sense the pressure of the pressurized gas along its flow path.

11. A method for detecting the presence or absence of a fluid in a tank or the like at a selected level including:
supplying pressurized gas along a flow path;
blocking the flow path with fluid from the tank when the tank has fluid at the selected level without any intermixing of the pressurized gas and the fluid;
and determining whether the flow path of the pressurized gas is blocked.

12. The method according to claim 11 including sensing the pressure of the pressurized gas in its flow path to determine whether the flow path of the pressurized gas is blocked.

13. The method according to claim 12 in which sensing of the pressurized gas in its flow path is beyond the blocking of the flow path when there is fluid at the selected level in the tank.

14. The method according to claim 11 including disposing an expansible container within the flow path of the pressurized gas and in communication with the tank at the selected level so that the expansible container expands to block the flow path when fluid in the tank is at the selected level.

* * * * *